United States Patent [19]
Favre

[11] 3,732,472
[45] May 8, 1973

[54] CURRENT SUPPLY AND COMMUTATION CIRCUIT OF ELECTRIC MOTOR

[75] Inventor: Robert Favre, Lausanne, Switzerland

[73] Assignee: Golay Buchel & Cie S.A., Lausanne, Switzerland

[22] Filed: June 15, 1970

[21] Appl. No.: 46,438

Related U.S. Application Data

[63] Continuation-in-part of Ser. No. 676,871, Oct. 20, 1967, abandoned.

[30] Foreign Application Priority Data

Oct. 26, 1966 Switzerland............................15601/66

[52] U.S. Cl.....................318/138, 318/432, 318/696
[51] Int. Cl..............................................H02k 37/00
[58] Field of Search........................313/138, 254, 696, 313/685, 432, 434

[56] References Cited

UNITED STATES PATENTS

| | | | |
|---|---|---|---|
| 3,495,149 | 2/1970 | Swain | 318/138 |
| 3,412,307 | 11/1968 | Welch | 318/434 X |
| 3,600,658 | 8/1971 | Kunijoshi | 318/138 |
| 3,414,800 | 12/1968 | Sheldrake et al. | 318/138 X |
| 3,424,962 | 1/1969 | Gawron | 318/138 |
| 3,414,795 | 12/1968 | Weiser | 318/434 X |
| 3,452,263 | 6/1969 | Newell | 318/696 |
| 3,577,176 | 5/1971 | Kreithen | 318/432 |
| 3,526,819 | 9/1970 | Graf | 318/434 X |

*Primary Examiner*—G. R. Simmons
*Attorney*—Emmanuel J. Lobato et al.

[57] ABSTRACT

An electronic commutation circuit for a three phase electric motor is supplied with direct current by a circuit having a high internal non-ohmic impedance in relation to the impedance of the load. The supply circuit comprises an electronic interrupter, an inductance coil and a resistance in series with the motor commutation circuit. The supply circuit is opened when the current reaches a selected upper limit value and is closed when the current reaches a lower limit value thereby maintaining the current substantially constant. The limits may be made responsive to a motor function, for example speed or load. The switching of the commutating circuit is effected by transistors or thyristors under control of a cyclical impulse generator and distributor.

12 Claims, 6 Drawing Figures

FIG. 1
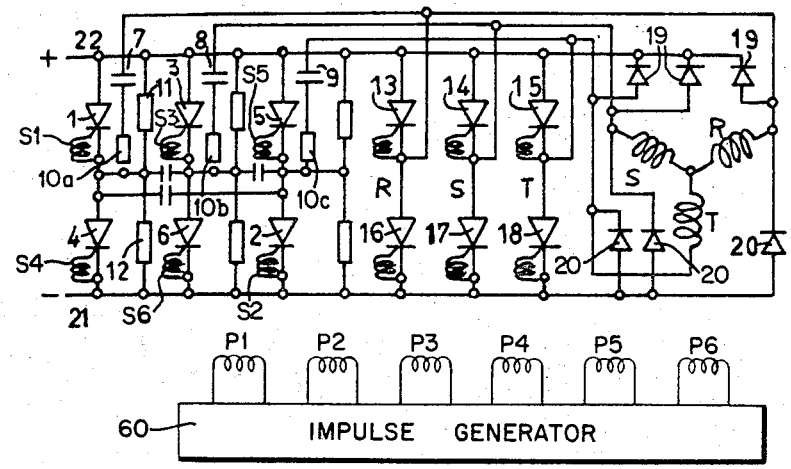
FIG.1A
FIG. 2
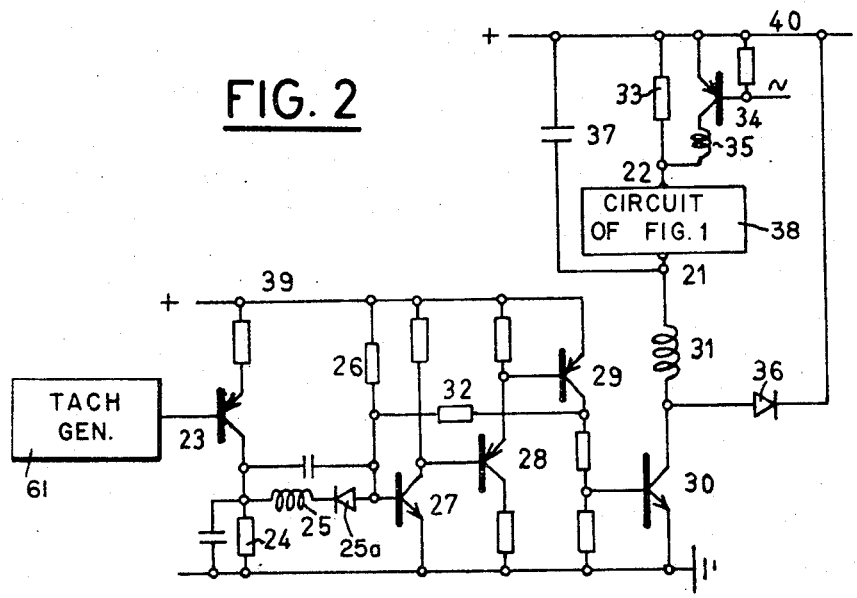
FIG.4
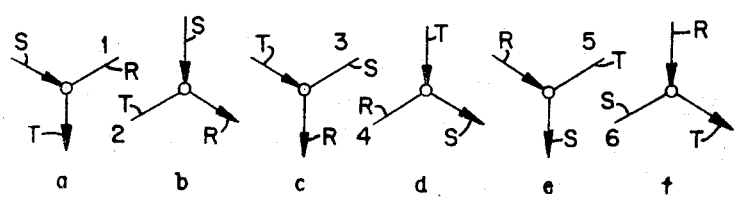

CURRENT SUPPLY AND COMMUTATION CIRCUIT OF ELECTRIC MOTOR

This application is a continuation-in-part of my application Ser. No. 676,871 filed Oct. 20, 1967 now abandoned.

The present invention relates to electronically commutated motors and particularly to supply and control circuitry for such motors.

The electronic commutation of electric motors either of the induction type or synchronous type is well known particularly in its application to variable speed motors and especially to motors operating at very high speeds.

The static invertors utilized for the electronic commutation of electric motors rarely deliver a sinusoidal output voltage by reason of the very high price of such invertors and the fact that a sinusoidal voltage is not always best adapted to the purpose. Certain motors, notably synchronous motors, operate better with a voltage wave that is approximately rectangular.

There exists a technique known as "phase cutting" which permits generating in each phase of the motor a current of optimum wave form. However, the production price of equipment utilizing this technique is still relatively high.

In a large number of cases a current of approximately rectangular wave form with a regulated amplitude and a limited upper value constitutes the best compromise between the cost of production of the invertor and the efficiency of the motor. In accordance with the invention these objectives are obtained in a simple manner by:

1. Feeding the motor by a source of direct current having an internal non-ohmic impedance which is relatively high with respect to the normal impedance of the load, the output current being regulated, for example in accordance with the speed or the load of the motor, in such manner as to limit the reactive energy of the motor particularly under low load conditions.

2. By effecting the cyclical commutation of the phases in such manner that the current is always established between two terminals of the motor winding and between two terminals only at any one time.

The characteristics and advantages of the invention will be more fully understood from the following description in conjunction with the accompanying drawings in which:

FIG. 1 is a circuit diagram of a circuit in which commutation of a three phase motor is effected with semiconductor elements of the "thyratron" type;

FIG. 1A shows schematically a cyclical impulse generator controlling the commutation circuit of FIG. 1;

FIG. 2 is a circuit diagram of a current supply circuit for the commutated electric motor shown in FIG. 1;

FIG. 4 is a schematic diagram showing the respective vectorial positions of the phases at the time of transistion of the commutation from one phase to another with the commutation system shown in FIG. 1 as well as in FIG. 3;

Figure 3:
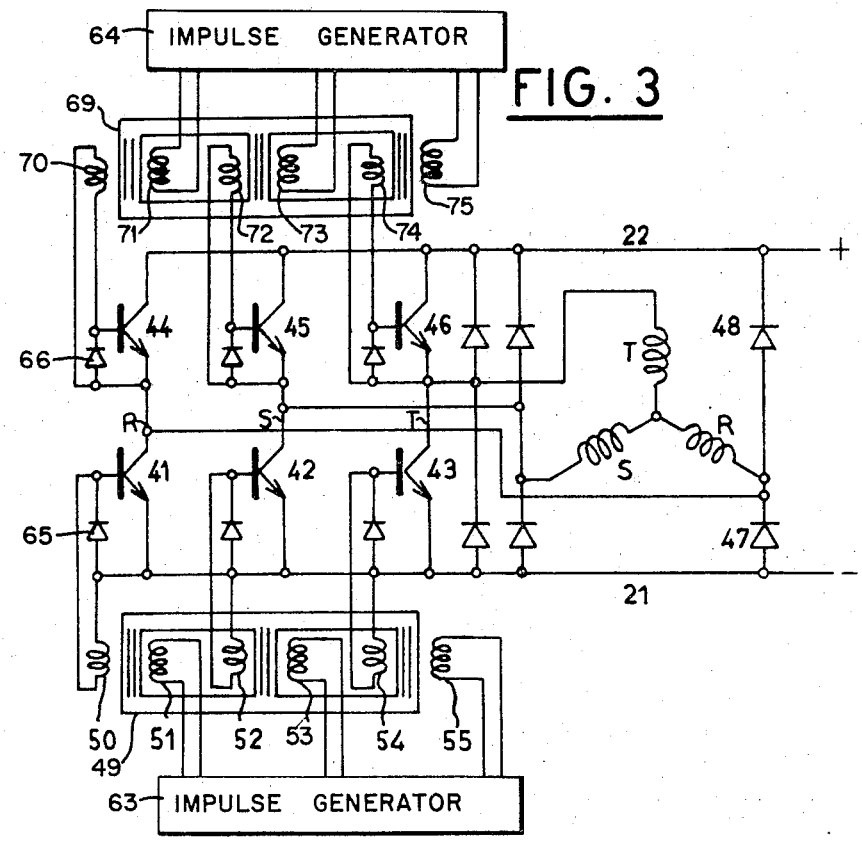
FIG. 3 is a circuit diagram of a commutation circuit using semiconductor elements of the transistor type.

In FIG. 1 there is shown the commutation circuit of a three phase motor having phase windings R, S and T which are shown connected in star configuration but can, if desired, be connected in delta configuration, according to whether the motor characteristics of a star configuration or a delta configuration are desired. The commutation circuit comprises switching elements in the form of semi-conductors of the thyratron type, i.e. thyristors, for selectively connecting each of the motor windings either to the negative output line 21 or the positive output line 22 of a direct current power supply as shown in FIG. 2 and described below. Thus, thyristors 13, 14 and 15 when conductive connect the respective windings R, S and T with the positive power supply line 22 while thyristors 16, 17 and 18 connect the motor windings R, S and T respectively with the negative power supply line 21. The thyristors 13 to 18 are cyclically controlled, as will be described more fully below, so that at any one time one and only one of thyristors 13 to 15 and one and only one of thyristors 16 to 18 are conductive, the two thyristors of a pair connected to the same winding never being conductive at the same time.

Diodes 19 and 20 are connected as shown to absorb reactive current induced in the motor windings R, S and T respectively through rotation of the rotor.

There are available thyristors of the "turn-off" type which can be blocked as well as unblocked by the control electrode. However, thyristors of this type are expensive. In the circuit shown in FIG. 1 the thyristors 13 to 18 are ordinary thyristors, the blocking of which requires the application of a brief pulse of opposite polarity. The blocking pulses are obtained from auxiliary thyristors 1 to 6 which are also mounted in pairs, 1 and 4, 3 and 6, and 5 and 2. Each pair of auxiliary thyristors control one of the phases R, S or T through a capacitive coupling provided by capacitors 7, 8 and 9 in series with small damping resistances 10a, 10b and 10c respectively. Resistances 11 and 12 provide initial bias. The auxiliary thyristors are capacitively coupled with one another as shown so that a single auxiliary thyristor on the positive side of the circuit and a single auxiliary thyristor on the negative side of the circuit are conductive at any one time. The thyristors are unblocked in numerical order and the unblocking of a thyristor causes the blocking of the preceding thyristor by reason of the capacitive intercoupling.

The auxiliary thyristors of a pair such as 1 and 4 function alternately so that it is not necessary to discharge the capacitors 7–9 through an ohmic resistance between each blocking operation as is necessary in some circuits.

The firing of the commutation thyristors and auxiliary thyristors is effected in known manner by pulses supplied, for example by an electronic impulse counter or a cyclical impulse generator working as a counter and providing pulses sequentially at a predetermined rate. Such an impulse generator is disclosed in Favre U.S. Pat. No. 3,436,631. The pulses are for example transmitted to the thyristors inductively by a winding shown between the control electrode and the cathode of each thyristor in FIG. 1. These windings constitute the secondaries of transformers, the primaries of which constitute the outputs of the cyclical impulse generator. Thus, in FIG. 1A there is shown by way of example an impulse generator 60 having primary output windings P1, P2, P3, P4, P5 and P6 inductively coupled respectively with secondary windings S1, S2, S3, S4, S5 and S6 controlling respectively the firing of auxiliary thyristors 1–6. The auxiliary thyristors are fired in sequence at a predetermined rate to provide commutation of the motor windings as described below.

In a given case, the firing of each commutation thyristors is simultaneous with the extinction of another commutation thyristor. In other words, the firing of one commutation thyristor is simultaneous with the firing of an auxiliary thyristor, the latter causing simultaneous blocking of the corresponding commutation thyristor. Hence, the firing of the commutation thyristors can, through suitable connections, be controlled by the same cyclical impulse generator that controls the auxiliary thyristors. Alternatively, the firing of the auxiliary thyristors and the firing of the commutation thyristors can be controlled by separate impulse generators properly synchronized with one another. The rate at which pulses are cyclically supplied by the impulse generator or generators controls the rate of commutation and hence the speed at which the motor operates.

The sequence of commutation of the motor windings is illustrated by way of example in FIG. 4 in which the motor windings are represented by vectors R, S and T respectively. The conductivity of the respective windings is indicated by heavier lines with arrowheads indicating the direction of current flow. At the time period represented by diagram *a*, thyristors 14 and 18 are unblocked so that windings S and T are conducting. Current flows from the positive supply line 22 through thyristor 14, motor windings S and T and thyristor 18 to the negative supply line 21. The following switching steps then occur.

The next pulse supplied by the impulse generator 60 through the primary transformer winding P2 to the corresponding secondary winding S2 causes the firing of auxiliary thyristor 2 and hence the blocking of thyristors 18 and 6 (which have previously been conductive). The blocking of thyristor 18 causes thyristor 16 to be unblocked. The windings S and R are hence conductive as indicated in diagram *b* of FIG. 4 so that current flows from the positive supply line 22 through thyristor 14, motor windings S and R and the thyristor 16 to the negative supply line 21.

The next impulse supplied from the primary winding T3 to the corresponding secondary winding S3 causes the firing of auxiliary thyristor 3. This causes the blocking of the corresponding commutating thyristor 14 and the auxiliary thyristor 1. The blocking of thyristor 14 causes the unblocking of thyristor 15. Motor windings T and R are now conductive as indicated in diagram *c* of FIG. 4. Current flows from the positive supply line 22 through thyristor 15, motor windings T and R and thyristor 16 to the negative supply line 21.

The next pulse supplied through primary winding T4 to secondary winding S4 causes the firing of auxiliary thyristor 4 and consequently the blocking of commutating thyristor 16 and auxiliary thyristor 2. The blocking of thyristor 16 causes the unblocking of thyristor 17. Motor windings T and S are now conductive as illustrated in diagram *d* of FIG. 4 so that current flows from the positive supply line 22 through thyristor 15, motor windings T and S and thyristor 17 to the negative supply line 21.

This sequence of operation continues in like manner. Thus, as illustrated in diagram *e* of FIG. 4, windings R and S are conducting while in the following time period represented by diagram *f*, the windings R and T are conducting. Commutation of the motor windings is thus effected by way of example in the following sequence:

| Positive alternation of phases | +− | |
|---|---|---|
| | ( S− T | |
| | ( S− R ) | Negative alternation |
| Positive alternation of phase T | ( T− R ) | of phase R |
| | ( T− S ) | Negative alternation |
| Positive alternation of phase R | ( R− S ) | of phase S |
| | ( R− T ) | Negative alternation |
| | S− T ) | of phase T |

The commutation provided by the commutating thyristors 13 to 18 controls not only the speed of the motor but also the direction of rotation of the motor by reason of the sequence in which the thyristors are unblocked. It will be seen that at any one time one winding and one winding only is connected to the positive supply line and one winding and one winding only is connected to the negative supply line, the winding connected to the negative supply line being, of course, different from that connected to the positive supply line to avoid a short circuit. The wave form of the current supplied by the commutating thyristors is essentially rectangular. Since each time a thyristor is blocked a succeeding thyristor is simultaneously fired, the current drawn from the supply line 21–22 remains essentially constant.

In accordance with the invention current is supplied to the motor commutation circuit shown in FIG. 1 by a supply circuit having an internal dynamic impedance which is high relative to the impedance of the load so that the current is substantially constant irrespective of the load. The ohms loss in the supply circuit is low. Such a circuit is shown by way of example in FIG. 2 in which the circuit of FIG. 1 is represented by the block 38 which is shown —as in FIG. 1— with input terminals 21 and 22. The current supply circuit is shown as comprising transistors 27, 28, 29 and 30 connected in cascade so that transistor 30 is conductive when transistor 27 is conductive and is nonconductive when transistor 27 is blocked. The transistors 27 to 29 are connected between ground and a positive d.c. supply line 39. The emitter of transistor 30 is connected to ground while the collector is connected through a reactance shown as an induction coil 31 to the terminal 21 of the motor commutation circuit 38. The other input terminal 22 of the motor commutation circuit is connected through a parametric resistance 33 to the positive side 40 of a direct current supply. Thus, a flow of current through the motor commutation circuit and the induction coil 31 and measuring resistance 33 connected in series therewith is controlled by the transistor 30.

The conduction of the transistor 27 and hence of transistor 30 is controlled by the value of the current flowing through the inductance coil 31 and hence through the parametric resistance 33. Transistor 27, biased by a resistance 26, is unblocked by the voltage drop across a resistance 24 in the collector circuit of a transistor 23 to the base of which a steady but preferably variable voltage is applied. The voltage developed in the resistance 33 in series with the motor circuit is cut at high frequency by a transistor 34 to the base of which a high frequency signal is applied by a suitable signal generator and is applied to the primary 35 of a transformer, the secondary winding 25 of which is connected in series with a diode 25a between the resistance 24 and the base of the transistor 27 in such manner that the voltage across the secondary winding 25 rectified by the diode 25a opposes the voltage across the resistance 24. Hence, when the current through the resistance 33 and hence the voltage across this resistance reaches a predetermined value, the resulting voltage transmitted through the primary winding 35 to the secondary winding 25 of the coupling transformer causes blocking of the transistor 27 and hence blocking of the transistor 30.

Figure 5:
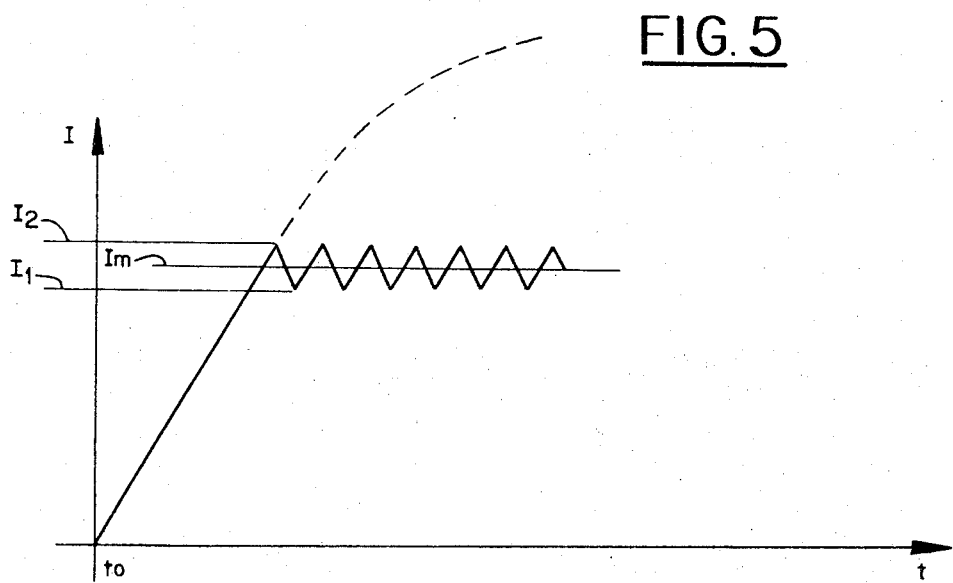
FIG. 5 is a graft illustrating the current output characteristics of the current supply circuit shown in FIG. 2.

The operation of the circuit will now be described with reference to FIG. 5 in which the abscissa represents time and the ordinate represents the value of current supplied to the motor commutation circuit 38. Assuming that at time to the transistor 30 is unblocked so as to connect the motor commutation circuit 38 in series with the coil 31 and resistance 33 between ground and the positive voltage supply 40, the current in the circuit will increase according to an exponential function, the initial portion of which is essentially linear. When the current has increased to a value I2 the voltage generated in the resistance 33 and applied to the base circuit of the transistor 27 causes the transistor 27 and hence transistor 30 to become nonconductive. By reason of the self-inductance of the coil 31, current continues to be supplied to the circuit 38 through the diode 36. This current decreases exponentially until it reaches a lower limit I1 whereupon the voltage drop across the resistance 33 applied through the transformer 25, 35 to the base circuit of transistor 27 as decreased to a value at which the transistor 27 and hence the transistor 30 become conductive. The current in the circuit 38 thereupon again increases exponentially until it again reaches the upper limit I2. This operation is repeated so that the current oscillates between the lower limit I1 and the upper limit I2 and hence has a mean value Im. The oscillations are smoothed out by a capacitance 37 connected in shunt with the circuit 38 and the resistance 33. Hence, the commutation circuit is continuously supplied with current. By reason of the amplification permitted by the cutting operation of transistor 34 and the transformer ratio between the primary and secondary of the transformer 25, 35 (which is preferably a step-up transformer), the voltage drop in the measuring resistance 33 can be limited to a few tenths of a volt.

The value of the current supplied to the motor circuit 38 can be regulated by varying the voltage applied to the base of the transistor 23. This voltage can, if desired, be varied as a function of a parameter of operation of the motor, for example its load or speed. For example there is shown in FIG. 2 by way of example a tachometer generator 61 which is responsive to motor speed, and hence also to motor load since (with an induction motor) speed varies with load. The output voltage of the tachometer generator is applied to the base of the transistor 23. The voltage of the tachometer generator is applied in such a way that the bias voltage of transistor 23 decreases (and hence current limit I2 decreases) when the motor speed increases and visa versa. Instead of a tach-generator, other known means for producing a voltage that is proportional to the motor speed or the motor load can be employed. The difference between the lower limit I1 and the upper limit I2 of the current is determined primarily by the resistance 32.

The frequency of commutation of the transistor 30 depends primarily on the voltage 40, the voltage across terminals 21–22 (dependent for example on load conditions of the motor) and on the inductance of the coil 31. It will be noted that the coil 31 is not traversed by an alternating current and in no way opposes the setting up of current in the motor, a function of rotational speed.

In FIG. 3 there is shown a commutation circuit in which the switching is effected by transistors rather than thyristors. As in the case of FIG. 1, the motor is shown as being of the three phase type with star or delta connection of the motor windings. The circuit is shown as comprising six transistors of which transistors 41, 42 and 43 are arranged to connect motor windings R, S and T respectively with the negative current input line 21 while transistors 44, 45 and 46 are arranged to connect the motor windings respectively with the positive supply line 22. The current supply lines 21 and 22 are the output lines of the current supply circuit shown in FIG. 2. Thus, the circuit block 38 in FIG. 2 represents either the motor commutation circuit of FIG. 1 or that of FIG. 3.

The switching of transistors 41 to 43 is controlled by a cyclical impulse generator 63 coupled with the transistors through a transformer 49 while the switching of transistors 44 to 46 is controlled by a cyclical impulse generator 64 coupled with the transistors through a transformer 69. As in the circuit of FIG. 1A, the impulse generator produces pulses at a selected frequency and distributes them cyclically to the respective switching elements in the manner of an electronic impulse counter operating in a closed circuit. The transformer 49 is shown as having primary windings 51, 53 and 55 with corresponding secondary windings 50, 52 and 54 connected in the base circuits of transistors 41, 42 and 43 respectively. Only one of the transistors 41 to 43 can be conducting at one time. If, for example the primary 51 is energized so as to cause the unblocking of transistor 41, the secondaries 52 and 54, the respective primaries of which are open, are then subjected to a blocking flux of transistors 42 and 43. Diodes 49 avoid an abrupt demagnetization of the corresponding transformer circuit during the blocking of a transistor. Such abrupt demagnetization would be liable to cause the unwanted simultaneously unblocking of two transistors. In like manner, the coupling transformer 69 has primaries 71, 73 and 75 connected with the cyclical impulse generator 64 while corresponding secondaries 70, 72 and 74 are connected respectively in the base circuits of transistors 44, 45 and 46. Diodes 66 correspond to the above mentioned diodes 65 and avoid abrupt demagnetization of the corresponding transformer circuits. While two impulse generators and two transformers have for convenience been shown in FIG. 3, it will be understood that they may be replaced by a single impulse generator and a single coupling transformer having six primaries and six secondaries.

The order of commutation of the motor windings is the same as has been described with reference to FIGS. 1 and 4. As in the case of FIG. 1, one and only one commutation path is at all times in operation. The result is a current wave form of substantially rectangular shape owing to the high dynamic impedance of the current source shown in FIG. 2. The current can, as has been described, be made dependent on a function of the motor load or speed, for example in such a way as to provide a current of minimum value under no low conditions and thereby reduce heating of the motor. Diodes 47 and 48 function like diodes 19 and 20 in FIG. 1 to absorb induced current.

The three phase transformers controlling commutation of the motor must naturally transmit useful frequencies from a minimum value which for induction motor may be around 4 Hz (sliding friction corresponding to a maximum couple at a given current) and a maximum frequency depending on the speed of the motor. For example the frequency may reach 1,000 Hz for a motor rotating at 60,000 r.p.m.

The fact that the circuit of FIG. 3 requires only NPN transistors results in a relatively low cost price for the circuit while permitting the use of high voltages and the use of a direct rectification of the voltage of the three phase sector. Thus, as in the case of FIG. 1, good operating characteristics and high efficiency are obtained at a low cost.

The combination of a commutating circuit as shown in FIGS. 1 and 3 with the current supply circuit shown in FIG. 2 has the following important advantages:

1. The limitation of the maximum current value avoids excess current, for example on starting or through accidental operation of the motor, which might result in the destruction of the commutating semiconductors.

2. The fact that two terminals and two terminals only of the motor winding are at all times connected with the current input results in applying to each phase of the motor winding a current of substantially rectangular wave form with resulting high torque and efficiency.

3. The possibility of controlling the current as a function of a parameter of the operation of the motor permits limiting the reactive energy in the motor to a minimum value thereby increasing the efficiency of the motor and reducing heating particularly under low load conditions.

4. The possibility of working in a relatively wide speed range without changing the windings and without a transformer adapter, the substantially constant current source automatically adapting the voltage at the terminals of the motor to an optimum value according to the motor speed.

The circuitry in accordance with the present invention thus provides good operating characteristics of an electronically commutated motor while reducing the cost of production. It will be understood that this invention is applicable to electronically commutated motors of both the synchronous type and the induction type. In either case, the speed of the motor is regulated by the impulse generator and distributor which controls the switching elements of the commutating circuit and which is preferably variable to provide cyclical pulses at selected rates to provide the motor speed desired. With an induction motor it will be understood that slippage occurs between the rotor and the rotating field produced by commutation of the current in the motor windings, the slippage being proportional to load.

What I claim and desire to secure by Letters Patent is:

1. A current supply and commutation circuit of an electric motor having a plurality of phase windings comprising a motor commutating circuit and a current supply circuit, said commuting circuit comprising first and second bus lines of different potential, a pair of switching elements for each motor phase winding, one of said switching elements of each said pair connecting the respective motor winding with said first bus line and the other of said switching elements of each said pair connecting the respective motor winding with said second bus line, means controlling said switching elements to operate cyclically in predetermined sequence at a selected rate to connect one and only one said winding to said first bus line and to connect another and only one of said windings with said second bus line at any one time; said supply circuit having output terminals connected respectively with said bus lines and comprising a direct current power supply line, an electronic interrupter, an inductance coil and a resistor connected in series with said commutation circuit across said direct current power supply line; a diode connected in shunt across said series connected inductance coil, said motor commutating circuit and said resistor to provide a path of flow of current from said reactance coil through said motor commutating circuit when said interrupter is open and means sensing the current flowing through said resistor and controlling said interrupter to open said interrupter when said current increases to a selected upper limit and to close said interrupter when said current decreases to a selected lower limit, thereby maintaining said current substantially at a selected mean value irrespective of the impedance of said motor.

2. A circuit according to claim 1, in which said supply circuit comprises a plurality of transistors connected in cascade of which a first transistor constitutes a control transistor and the last transistor in said cascade constitutes said interrupter.

3. A circuit according to claim 2, in which said sensing and controlling means comprises a high frequency chopper, a transformer having a primary winding and a secondary winding, and a rectifier, said chopper and said primary winding being connected in series with one another across said resistor and said secondary winding and rectifier being connected in circuit with said first transistor to control the conduction of said first transistor and thereby control said interrupter.

4. A circuit according to claim 2, comprising means for varying said upper and lower limits of said current at which said interrupter is opened and closed respectively.

5. A circuit according to claim 4, in which said current limit varying means comprises means for biasing said first transistor and for varying said bias.

6. A circuit according to claim 5, in which said biasing means biases said first transistor to conduction and in which said sensing and controlling means comprises a high frequency chopper, a transformer having a primary winding and a secondary winding and a rectifier, said chopper and said primary winding being connected in series with one another across said resistor, and said secondary winding and rectifier being connected in circuit with said first transistor so that the rectified output of said secondary winding opposes said bias to block said first transistor when the voltage drop across said resistor as sensed by said primary winding and chopper exceeds a selected value.

7. A circuit according to claim 5, in which said biasing means comprises a bias resistor in the base circuit of said first transistor and a bias regulating transistor controlling the flow of current through said bias resistor.

8. A circuit according to claim 4, in which said means for varying said upper and lower limits of said current comprises means for varying said limits as a function of operation of the motor.

9. A circuit according to claim 8, in which said current limit varying means comprises means for biasing said first transistor and for varying said bias as a function of operation of the motor.

10. A circuit according to claim 9, in which said biasing means comprises a bias resistor in the base circuit of said first transistor, a bias regulating transistor controlling the flow of current through said bias resistor and means responsive to a function of operation of the motor controlling the conduction of said bias regulating transistor.

11. A circuit according to claim 1, comprising a capacitor connected in shunt across said series connected motor commutation circuit and resistor.

12. A circuit according to claim 1, in which said supply circuit comprises a diode connected in shunt across said series connected inductance coil, motor commutation circuit and resistor, a plurality of transistors connected in cascade of which a first transistor constitutes a control transistor and the last transistor of said cascase constitutes said interrupter, a bias resistor in the base circuit of said first transistor, a bias regulating transistor controlling flow of current through said bias resistor to bias said first transistor to conduction; said sensing and controlling means comprising a high frequency chopper, a transformer having a primary winding and a secondary winding and a rectifier, said chopper and said primary winding being connected in series with one another across said first mentioned resistor and said secondary winding and rectifier being connected in the base circuit of said first transistor so that the rectified output of said secondary winding opposes said bias to block said first transistor when the voltage drop across said first mentioned resistor as sensed by said primary winding and chopper exceeds a selected value.

* * * * *